United States Patent [19]
Schild et al.

[11] 3,783,761
[45] Jan. 8, 1974

[54] EXPOSURE CONTROL DEVICE FOR PHOTOGRAPHIC CAMERAS

[75] Inventors: Josef Schild, Vienna; Harald Wessner, Neunkirchen, both of Austria

[73] Assignees: Karl Vockenhuber; Raimund Hauser, both of Vienna, Austria

[22] Filed: Dec. 11, 1972

[21] Appl. No.: 313,696

[30] Foreign Application Priority Data
Dec. 9, 1971 Austria.................................. 10617

[52] U.S. Cl................. 95/11 R, 95/11 L, 95/31 FS, 352/141, 352/72, 95/64 D, 95/10 C
[51] Int. Cl. ............................................ G03b 11/00
[58] Field of Search ............ 95/11 R, 11 L, 11.5 R, 95/31 FS, 31 CA, 10 C, 64 D; 352/141, 72, 78

[56] References Cited
UNITED STATES PATENTS

| | | | |
|---|---|---|---|
| 3,589,258 | 6/1971 | Koeber............................ | 352/141 X |
| 3,625,125 | 12/1971 | Iida................................... | 95/11 R |
| 3,444,798 | 5/1969 | Mayr et al. ..................... | 352/141 X |

*Primary Examiner*—Robert P. Greiner
*Attorney*—Ernest G. Montague

[57] ABSTRACT

In a camera an objective is provided which defines an optical path having an axis. The objective comprises an adjustable diaphragm arranged within a diaphragm plane, and a neutral density spot cooperating with the diaphragm to diminish light intensity in the diaphragm plane within a central range on the axis. A gate is arranged on the optical path in a plane normal to the axis and receiving light through the objective for exposure of a film having a specific spectral sensitivity. A support is provided to carry the neutral density spot and has at least an inoperative and an operative position, in the operative position the neutral density spot is arranged in a central position on the axis, and in inoperative position the neutral density spot is excentric to the axis. A control device is connected to the support to control its position, the control device having at least two positions according to the spectral composition of light used for exposure of the film, whereby with artificial light the support is in the inoperative position, with day light the support means is in operative position.

9 Claims, 4 Drawing Figures

EXPOSURE CONTROL DEVICE FOR PHOTOGRAPHIC CAMERAS

This invention relates to a camera, preferably a cinematographic camera with a path of rays defined by a lens and a film gate, said lens being provided with an adjustable diaphragm cooperating with a gray filter, whereby the gray filter is insertable into the path of rays by means of a control mechanism from a rest position to at least one operative position in dependence on the scene light.

It has proved that with a strong scene brightness there occur phenomena of diffraction on the diaphragm adjusted to a smallest aperture. In that way the sharpness of the image was impaired and the picture lacked "brilliancy." It has therefore been suggested as an improvement to dispose the gray filter in the path of rays of the lens, or what was more advantageous and saving space, to provide the lens neighboring the diaphragm with a large, punctiform so-called gray filter spot corresponding to the diameter of the diaphragm aperture at which the phenomenon of diffraction already occured. However the disadvantage appeared that the gray filter spot remained inserted with artificial light shots at small scene brightness. This circumstance turned out to be a disadvantage with artificial light films and all the more with day light films. As it is known, a conversion filter is inserted into the path of rays of the lens upon use of day light films at artificial light, whereby however the light intensity striking the film to be exposed is impaired. If now the gray filter spot is additionally inserted into the path of rays, the scene light is the more weakened.

According to the invention it is therefore suggested with cameras as described above that the control mechanism for the gray filter be operated by an arrangement taking at least two different position in dependence on the spectral composition of the scene light — e.g. artificial light and day light — being preferably controlled by an illuminating system disposed on the lamp squash and attached to the camera. The control mechanism for the gray filter is expediently so operated that it moves the filter into the path of rays at day light and moves it out of the path of rays at artificial light. Certainly it is known to control a filter from the lamp squash of an illuminating system and to insert it into the path of rays. But these filters are always conversion filters, which serve, as already stated, to make photographs with artificial light films at day light or with day light films at artificial light, respectively. It is also known to control the filter by means of an operating key actuated by hand, which is movable to a position for day light or to a position for artificial light, respectively, in dependence on the scene light used.

As it is known, films with different speed are available in the trade. Upon use of films with a low speed the insertion of a gray filter into the path of rays would not be necessary, as under circumstances the already worse image quality — compared to films with a higher speed — would still be more impaired. According to an advanced development of the invention, it is therefore suggested that in a camera, preferably provided with an adjusting device for the film speed controlled by a catridge scanner, the gray filter be displaceable upon actuation of the control mechanism to two different positions by the adjusting device for the film speed, of which one position corresponding to the lower film speed is extra-axial preferably outside the path of rays, whereas the other position corresponding to the higher film speed is disposed within the path of rays.

As mentioned above, it is necessary to adapt photographs with day light films at artificial light and photographs with artificial light films at day light, respectively, to the light conditions at disposal. This adaptation results from the insertion of a conversion filter into the path of rays. An advantageous embodiment of the invention is to connect a support for the conversion filter with the control mechanism for the gray filter. Upon use of artificial light films however it has proved that at light conditions corresponding to day light the conversion filter as well as the gray filter are moved into the path of rays. According to the invention it is therefore suggested that upon use of artificial light films, the gray filter be provided on the conversion filter as gray filter spot being movable with the same into the path of rays.

Further details and features of the invention will become apparent from the specification of the embodiments schematically illustrated in the drawing.

Figure 1:
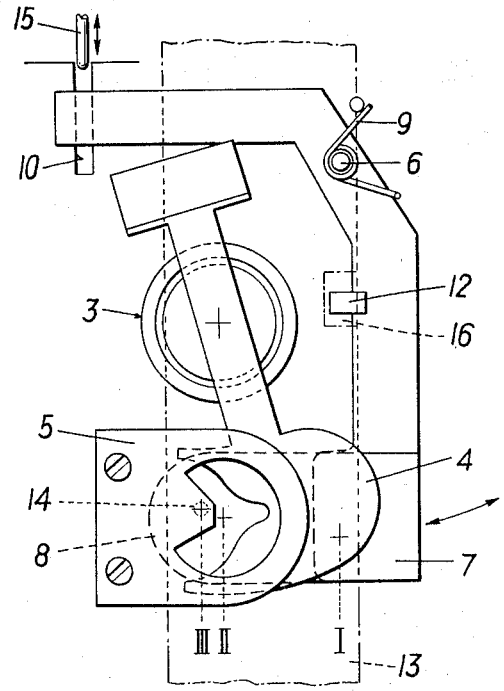
FIG. 1 shows an inventive arrangement in a camera, which is adapted for the use of super-8 films.

In a camera for super-8 films, not particularly shown in FIG. 1, a diaphragm vane 4 is arranged in the path of rays of a main lens 1 and a front lens attachment 2, situated between both of them, and controlled by a galvanometer, for instance, or a diaphragm adjusting motor 3. The light beam emanated by the object to be taken is confined by the diaphragm vane 4 and a mask 5 forming the diaphragm aperture together with the vane 4. A filter support 7 behind the diaphragm 4, 5, seen in the direction of the incident light, being pivotally arranged about an axis 6, bears a conversion filter 8. The arm of the filter support 7 bearing the filter 8 is biased by a thigh spring 9 in clockwise sense, so that the filter is moved into the path of rays of the lens. The other arm of the filter support 7 extends into a slot 10 arranged on the camera casing for an illuminating system 15. Finally there is a feeler slider 12 abutting the arm of the filter support 7, which bears the filter 8, said feeler slider 12 showing in the range of the filter support 7 a slope 11 and extending into the cartridge housing of the camera.

Figure 2:
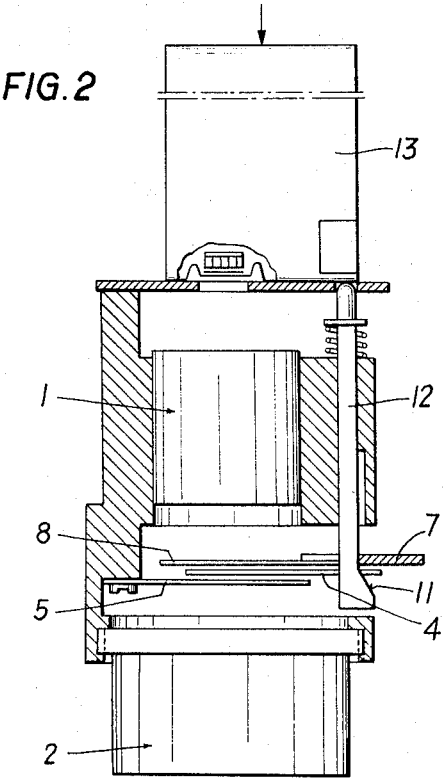
FIG. 2 shows a plan view of the arrangement shown in FIG. 1.
Figure 4:
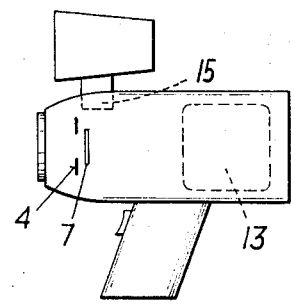
FIG. 4 shows schematically the design of the arrangement in a camera illustrated in FIGS. 1 and 2.

If now a super-8 cartridge 13 with a low speed film is inserted into the camera, the cartridge 13 shows no recess in the range where the feeler slider 12 abuts (see FIG. 2). If the photograph is made at sufficient light intensity, for instance at sun light, the insertion of a conversion filter is necessary with super-8 films, as these films are artificial light films. Since however the thigh spring 9 holds the filter 8 in the path of rays of the lens, no further manipulations are required. As the photograph is made with a low speed film, the feeler slider 12 elastically abutting the cartridge 13 is displaced in the direction of the optical axis so far, until the slope 11 comes out of the range of the arm of the filter support 7 bearing the conversion filter 8. According to the invention it has been suggested to provide the conversion filter itself with a neutral density spot with artificial light films. In that the slope 11 has been removed from the range of the filter support 7, the spring 9 deviates the filter support 7 in clockwise sense, related to FIG. 1, so that the neutral density spot on the conversion filter 8 comes to lie behind the mask 5 and therewith into the operating position III, where it is removed from the optical path of rays.

In cartridges with high speed films a recess 16 in the cartridge wall lies opposite the feeler slider 12, so that the slope 11 comes into the range of the filter support 7 and causes a deviation of the same in counterclockwise sense. The neutral density spot 14 takes the operating position II and is therewith inserted into the path of rays of the lens.

With insufficient light conditions artificial light has to be used and with super-8 films the conversion filter has to be removed from the path of rays. The device indicating the scene light at disposal is formed according to FIG. 1 by an illuminating system 15 disposed in the lamp squash. Upon insertion of the lamp squash 15 into the slot 10 provided therefor in the cartridge, the squash 15 presses the arm of the filter support 7 downwards against the force of a spring 9, related to FIG. 1. In that way the conversion filter 8 with the neutral density spot 14 reaches the rest position I, in which the filter 8 as well as the neutral density spot 14 — which with photographs at artificial light or similar light conditions has to be removed from the path of rays of the lens— become ineffective as to the influence on the scene light.

Figure 3:
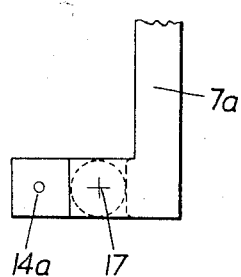
FIG. 3 illustrates schematically how a filter support could be designed upon use of day light films.

FIG. 3 shows only schematically how a filter support 7 has to be equipped for the use of a day light film. For the exposure of a day light film it is necessary, as already stated, to insert a conversion filter into the path of rays of the lens for shots with artificial light, whereby on account of the relatively small light intensity, the neutral density spot is kept outside the path of rays. The filter support 7a could then take the position illustrated in FIG. 3. With shots at day light the filter support 7a would then be deviated in counterclockwise sense, whereby in dependence on the film speed either the neutral density spot 14a is inserted into the path of rays of the lens 17 (high speed films), or also it is removed from the path of rays 17 (low speed films).

Finally it may be mentioned that the device indicating the scene light at disposal must not only be formed by the lamp squash. The operating arrangement for the neutral density spot could for instance also be controlled by a known meter for measureing the spectral composition of light.

In the illustrated embodiment the diaphragm cooperates with the mask, behind which the neutral density spot 14 is arranged at low film speed. With diaphragm systems without such a mask it may suffice to adjust the neutral density spot 14 excentrically to the optical axis.

What is claimed is:

1. In a camera an objective defining an optical path having an axis, said objective comprising
an adjustable diaphragm arranged within a diaphragm plane, and a neutral density spot cooperating with said diaphragm to diminish light intensity in said diaphragm plane within a central range on said axis;
gate means arranged on said optical path in a plane normal to said axis and receiving light through said objective for exposure of a film having a specific spectral sensitivity;
support means to carry said neutral density spot and having at least an inoperative and an operative position, in operative position said neutral density spot being arranged in a central position on said axis, in inoperative position said neutral density spot being excentric to said axis;
control means connected to said support means to control its position, said control means having at least two positions according to the spectral composition of light used for exposure of said film, whereby with artificial light said support means being in said inoperative position, with day light said support means being in operative position.

2. A camera as set forth in claim 1, wherein said control means comprise holding means for receiving an artificial light source and sensor means for sensing whether said light source is connected to the camera by said holding means.

3. A camera as set forth in claim 1, further comprising a conversion filter for adapting light entering through said objective for the spectral sensitivity of said film, said conversion filter having at least an operative and an inoperative position, in operative position said conversion filter being inserted into said optical path, in inoperative position said filter being out of said path; said control means also being connected to said conversion filter for controlling its position.

4. A camera as set forth in claim 3 and adapted to expose artificial light films, wherein said neutral density spot is arranged on said conversion filter itself.

5. In a camera an objective defining an optical path having an axis, said objective comprising
an adjustable diaphragm arranged within a diaphragm plane, and
a neutral density spot cooperating with said diaphragm to diminish light intensity in said diaphragm plane within a central range on said axis;
gate means arranged on said optical path in a plane normal to said axis and receiving light through said objective for exposure of a film having a specific spectral sensitivity;
support means to carry said neutral density spot and having at least one inoperative and an operative postion, in operative position said neutral density spot being arranged in a central position on said axis, in inoperative position said neutral density spot being excentric to said axis;
first control means connected to said support means to control its position, said first control means having at least one position corresponding to day light and one position corresponding to artificial light, and being operable in accordance with the spectral composition of light used for exposure;
second control means connected to said support means to control its position, said second control means having at least one position corresponding to a lower range of film speed and one position correspodning to a higher range of film speed;
said support means being in operative position only with said first control means being in day light position and said second control means being in its higher range of film speed position.

6. A camera as set forth in claim 5, wherein said support means have at least two inoperative positions, one of which corresponding to the artificial light position of said first control means, the other one corresponding to the day light position of said first control means and to the lower range of film speed position of said second control means.

7. In a camera an objective defining an optical path having an axis, said objective comprising
- an adjustable diaphragm arranged within a diaphragm plane,
- and a neutral density spot cooperating with said diaphragm to diminish light intensity in said diaphragm plane within a central range on said axis;
- gate means arranged on said optical path in a plane normal to said axis and receiving light through said objective for exposure of a film having a specific spectral sensitivity;
- means for receiving a film cartridge containing said film and having film speed signaling means, said cartridge receiving means being located behind said gate means with respect to said objective;
- support means to carry said neutral density spot and having at least one inoperative and an operative position, in operative position said neutral density spot being arranged in a central position on said axis, in inoperative position said neutral density spot being excentric to said axis;
- first control means connected to said support means to control its position, said first control means having at least one position corresponding to day light and one position corresponding to artificial light, and being operable in accordance with the spectral composition of light used for exposure;
- second control means connected to said support means to control its position, said second control means having at least one position corresponding to a lower range of film speed and one position corresponding to a higher range of film speed, wherein said second control means include feeler means to cooperate with said film speed signaling means of said cartridge for determing the position of said second control means;
- said support means being in operative position only with said first control means being in day light position and said second control means being in its higher range of film speed position.

8. A camera as set forth in claim 7 further comprising spring means urging said second control means into the position corresponding to the lower range of film speed, said second control means being movable into its higher range of film speed position by said feeler means against said spring means.

9. A camera as set forth in claim 7, wherein said feeler means are connected with at least one oblique control surface extending in moving direction of said feeler means, said support means being movable in a plane normal to the moving direction of said feeler means and being biased towards said control surface and abutting the same.

* * * * *